Figure 1:
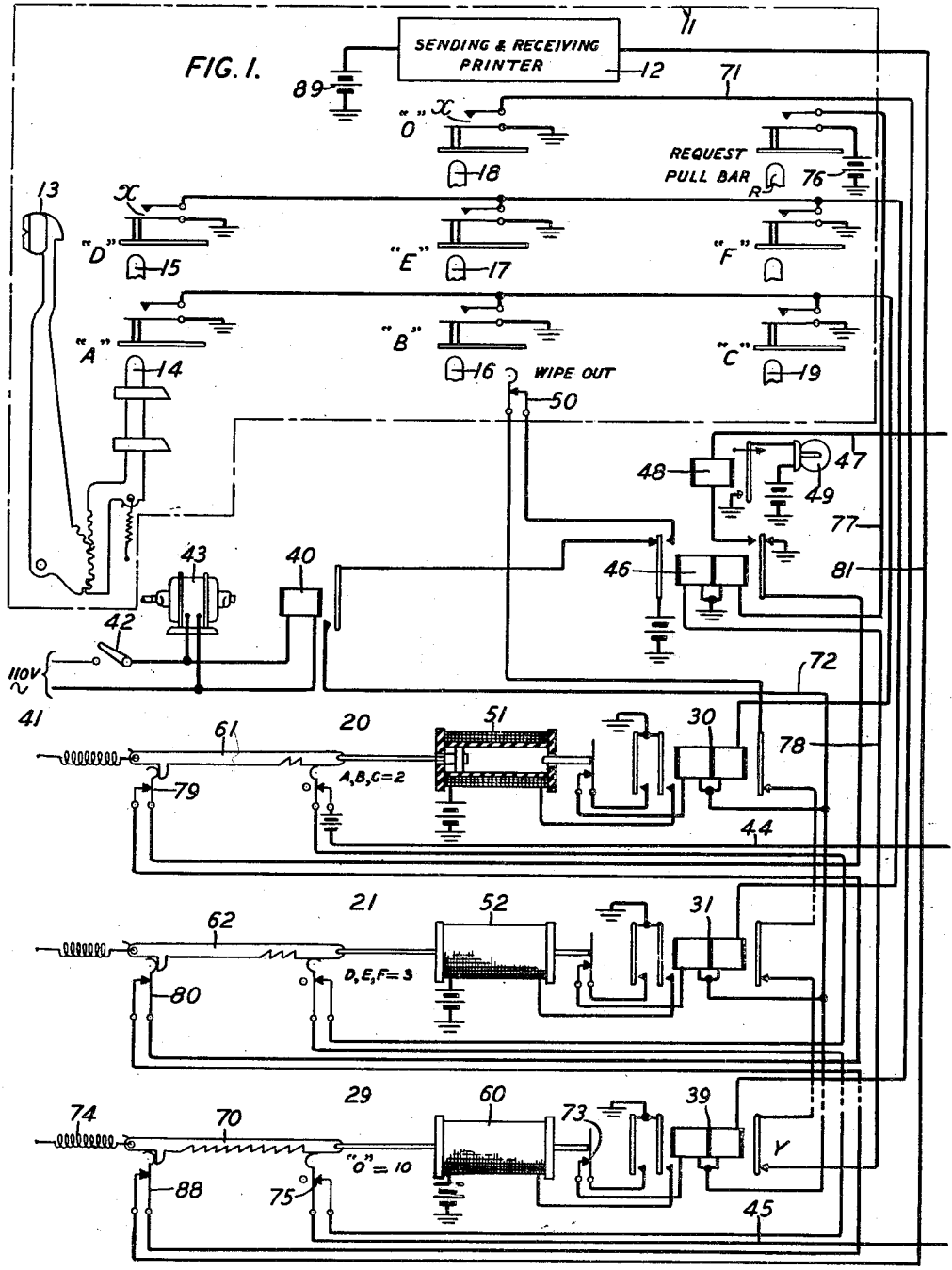

Nov. 14, 1933. L. A. GARDNER 1,934,687
TELEGRAPH SYSTEM
Original Filed Dec. 5, 1930   2 Sheets-Sheet 2

INVENTOR
L. A. GARDNER
BY
ATTORNEY

Patented Nov. 14, 1933

1,934,687

UNITED STATES PATENT OFFICE 1,934,687

TELEGRAPH SYSTEM

Leland A. Gardner, Maplewood, N. J., assignor to American Telephone and Telegraph Company, a corporation of New York Application December 5, 1930, Serial No. 500,394
Renewed June 8, 1933

11 Claims. (Cl. 178—4)

This invention relates to communication systems and more particularly to printing telegraph automatic exchange systems adapted for "stock" service.

The broad object of the invention is to provide improved communication between stock brokerage offices and a stock exchange.

Another object is to utilize machine switching apparatus peculiarly adapted for automatic telephone exchanges in conjunction with printing telegraph typewriters.

Another object is to translate a five or seven unit printing telegraph code into characters for operating machine switching telephone apparatus.

Heretofore it has been necessary for stock brokers when desiring the latest "bid and asked" quotations of any stock to call by telephone a stock quotation clerk over a private line which terminated in a manually operated switchboard located at a stock exchange. The operator at this switchboard connected the calling party to the stock quotation clerk who kept a record of the "bid and asked" quotations of all stocks. These quotations were obtained from the stock specialist located at each trading post on the floor of the exchange. This arrangement requires considerable time to obtain the desired information at a time, especially during extraordinarily active periods of the exchange, and subjects the brokers to considerable annoyance because of errors introduced by human agencies involved in completing the connection and in furnishing the information.

According to the disclosure of the applicant's copending application Serial No. 564,940, filed Sept. 24, 1931, the time required to obtain the desired information is greatly reduced and liability of errors due to human agencies is practically eliminated by the elimination of the telephone switchboard and the messenger service between the trading post and the stock quotation clerk. That system provides an arrangement wherein the operator or stock specialist at each trading post sets up on storing senders at the stock exchange the latest "bid and asked" quotations of all the stocks handled at their posts and a broker who is a subscriber to this service may, by operating on his telegraph typewriter a set of keys corresponding to the code of any stock of which he desires the latest "bid and asked" quotation, be connected automatically through a selecting mechanism at the exchange to a set of senders on which the desired information is stored. The operation of the key sets up on the tape at the broker's typewriter the symbol letter or letters of the particular stock and almost immediately the desired "bid and asked" quotations are printed adjacent to the letters. These results are obtained by means of a selecting mechanism which comprises rotary selector switches and combinations of selective relays directly responsive to the impulses produced by the operation of a telegraph typewriter printer set at the stock exchange.

In the present invention the same results are obtained by means of a plurality of decoding devices at the broker's office which are responsive to permutation code selecting impulses such as are produced by a telegraph typewriter printer set. The decoding devices convert the impulses received from the printer set into sequence selecting impulses such as telephone "dialing" impulses which in turn are transmitted to the stock exchange whereat they are received in a selecting mechanism comprising standard machine switching equipment of the type adapted for use in automatic telephone exchange systems.

A feature of the invention resides in a decoding arrangement wherein impulses of the five unit code type transmitted by means of a telegraph sender or typewriter are translated into "dialing" impulses essential to the operation of machine switching equipment.

Figure 2:
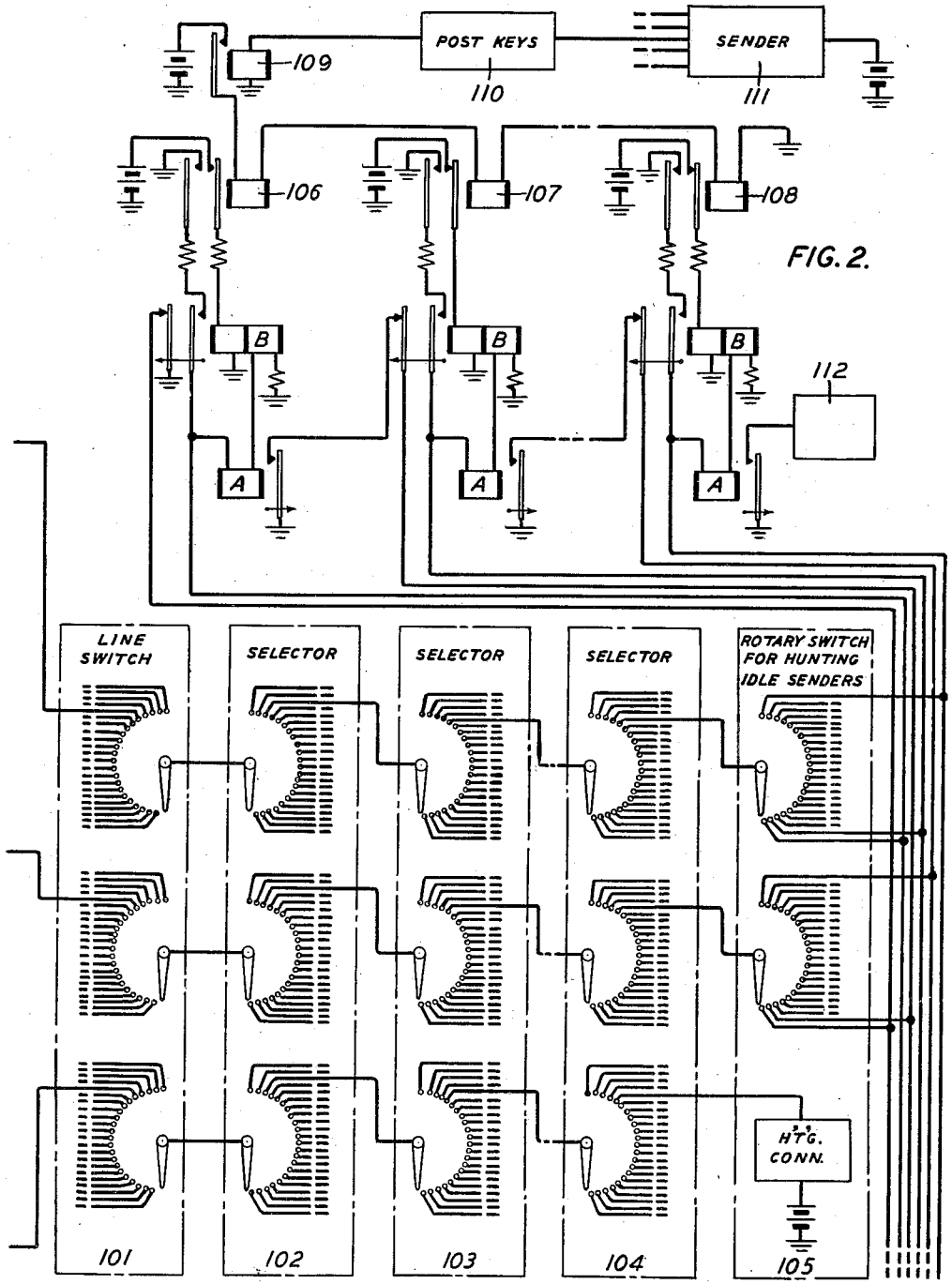

Other objects and features will appear from the following specification and appended claims when taken in conjunction with the drawings of which:

Figure 1 shows the equipment at the broker's office and Fig. 2 shows the equipment at the stock exchange.

Referring to Fig. 1 a telegraph typewriter printer is shown diagrammatically by block 11 wherein the block 12 represents the sending and part of the receiving mechanism. The receiving mechanism of the printer comprises a series of type bars, such as that designated 13, which are operated in response to both outgoing and incoming signals, by the pull bars 14, 15, 16, 17, 18, 19, etc., there being one pull bar and one type bar for each of the typewriter keys. There is also a "request" key which is effective to operate pull bar R which will be hereinafter described. The printer may be of the type disclosed in U. S. Patent 1,567,392 granted to E. L. Kleinschmidt on December 29, 1925, but modified by the addition of an arrangement such that each pull bar has associated with it a contact to be closed by the operation of the corresponding keyboard key. Each broker's office connected for the automatic stock quotation service, is provided with a telegraph typewriter whereby the initial operation for obtaining a quotation of a certain stock consists in sending from the telegraph typewriter to the stock exchange a certain letter or combination of letters as a request for the latest "bid and asked" quotations of the stock desired. In the arrangement described herein the symbol combination representing the stock may be of one, two or three letters. Combinations of one, two or three letters of the complete alphabet provide more than a sufficient number for the stocks listed on the New York Stock Exchange. Requests for quotations of stocks represented by a symbol of more than three could be handled on a manual overflow basis which is not a feature of this application. This request will before it leaves the broker's office be translated or converted from the five unit code usually employed in telegraph signaling, to the "dialing" impulse code usually employed with automatic telephone machine switching equipment. The printing of the symbols is done on the tape before the sending of the dial pulses inasmuch as these pulses are sent on the recession stroke of solenoid plunger bars.

The operation of the keyboard keys operate one or more of the pull bars, depending upon the number of letters in the transmitted symbol combination. Each pull bar when operated moves upward, in response to the operation of its associated mechanism, to perform two functions, namely, to operate its associated type bar which prints the letter assigned to it, as stated above, and to close a certain circuit to an associated decoding device of the ten coding devices 20 to 29 wherein the transmitted five unit code is converted into "dialing" impulses for transmission to the stock exchange. These decoding devices make it possible to send out over a line circuit a definite number of impulses for each of the letters used in the combination, for example, two impulses for each of the letters A, B and C, three impulses for each of the letters D, E and F, four impulses for each of the letters G, H and I, five impulses for each of the letters J, K and L, six impulses for each of the letters M, N, O, seven impulses for each of the letters P, R, S, eight impulses for each of the letters T, U, V, nine impulses for each of the letters W, X, Y, ten impulses for zero and one impulse for each of the letters Q and Z. The use of these devices permits the use of standard machine switching telephone equipments as a means of selecting the transmitting point of a certain stock and the telephone equipment then selects an idle transmitting or sender relay in a group associated with the particular stock.

When one of the code keys at printer 11 is operated a contact $x$ is closed by the operation of the pull bar associated with the operated key. The closure of a contact $x$ completes a circuit extending through the right hand winding of one of relays 30 to 39, inclusive, to grounded battery at the armature of relay 40. Relay 40 is maintained in its operated position from source 41 of alternating current which is adapted when switch 42 is in a closed position, to operate the printer motor 43. The selected relay which is operated by the closure of contact $x$, locks itself through its left hand winding, over a contact at the right end of a solenoid of the selected decoding device, to ground at the outer left armature of the selected relay. The operation of the selected relay connects ground over the inner left armature and contact of the relay through the winding of the solenoid associated with the selected decoding device, to grounded battery. The solenoid operates to draw a plunger bar connected to its core to a point where the contact at the right hand end of the solenoid is opened causing the release of the selected relay and deenergization of the solenoid. Consequently the bar connected to the solenoid core is permitted to return to normal and in so doing causes a normally closed contact to open and close a number of times corresponding to the code key which was operated. The retraction of the plunger bar may be satisfactorily accomplished by any suitable means such as a coil spring, the speed of retraction being regulated by a dash dot relay effect within the solenoid or a balance wheel arrangement. Opening and closing of the normally closed contact causes a series of pulses to be transmitted in the machine switching system code directly over the request line conductors 44 and 45. These impulses are transmitted to the stock exchange for the purpose of selecting a desired transmitting point. The retraction of the plunger bar simulates "dialing" as employed in automatic telephone systems.

In order to prevent the operation of a second key on the telegraph typewriter before the impulses corresponding to the key previously operated, have been transmitted over the "request" line 44—45, the local circuit of the telegraph typewriter will be opened at a contact at the left end of the selected plunger bar during the time that such plunger is off normal. The local circuit may be traced from ground at the right hand armature and back contact of relay 46, over the closed contacts at the left hand end of each of the plunger bars, taken successively, to grounded battery at the printer mechanism represented by block 12. When this circuit is open all keys at the typewriter are locked in their normal positions.

The operating procedure for obtaining a quotation is as follows: Reference will be made to a chart at the brokerage office showing the number of the post in the stock exchange at which each stock is traded. This number will then be typed. The impulses transmitted will simulate the name of an exchange as applied to telephone machine switching. The symbols of the desired stock simulating the telephone number in a certain exchange will then be typed after which a key, preferably on the keyboard, referred to herein as the "request" key and represented on the drawing by its associated pull bar R will be operated. The operation of the "request" key operates relay 46 in a circuit extending from ground, through the right hand relay winding, to grounded battery at the contacts of pull bar R. Relay 46 locks itself in a circuit extending from grounded battery at its left hand armature, the closed contacts of key 50, the normally closed contacts at each of the right hand armatures of relays 30 to 39, through its left hand winding to ground. The operation of relay 46 removes ground from local circuit and in its place a third conductor 47 which also extends to the stock exchange, is connected. The circuit thus established is such that incoming quotations will be received in the printer mechanism 12 and these quotations will be recorded adjacent to the symbols previously typed locally. As soon as the connection at the stock exchange has been established, at the desired point, such as by finding a ground at the armature of a sender relay, a slow release relay 48 included in the circuit of "quotation" line 47, is operated whereby a lamp 49 is lighted, indicating that an idle storing sender at the exchange has been engaged and that the desired quotations will be received at printer mechanism 12 immediately.

In order to release relay 46 when it is desired to receive the quotations on another stock, or at the end of a day's work a wipe-out key 50 is provided whereby the operating circuit for relay 46 may be opened.

If it is desired to follow the trend of any one stock over a period of time, relay 46 is allowed to remain in its operated position until a change is desired. In case this feature is not desired because of tying-up the selecting equipment at the exchange for a long period of time, a timing arrangement could be embodied in the sender equipment at the exchange such that only one quotation could be received as the result of one "request". Means for preventing the equipment from being tied-up for a long period of time is disclosed in the applicant's copending application, Serial No. 564,940, supra, wherein a restore relay 319, shown in Fig. 3 of the drawing thereof, is arranged to operate in response to a "wait" impulse which is transmitted by the "wait" distributor comprising ring sets 524 and 518 shown in Fig. 5, which forms a part of the common sending device at the exchange.

The translator or code changer consists of ten groups of apparatus 20 to 29, inclusive, each containing one relay of relays 30 to 39, one solenoid coil of coils 51 to 60, one plunger bar of bars 61 to 70, and its associated normal contacts at the right and the left ends of each bar. Associated in common with the ten groups of apparatus are relays 46 and 48 and lamp 49.

It will be necessary to locate stocks at the trading post in the exchange such that those represented by the same impulses would be at different posts. For example, a stock represented by symbol A, another by symbol B and another by symbol C could not be located at the same post.

Selecting mechanism

The purpose of this group of equipment is to select an idle sender relay at which the impulses corresponding to the "bid and asked" quotations of the requested stock are being repeated. This equipment comprises a line finder switch or a plurality of line finder switches represented diagrammatically by block 101. The first open impulse transmitted over "request" line 44—45 is received by the stepping or operating mechanism of the line finder switch 101 wherein the particular contacts associated with line 44—45 are engaged by the rotating wipers on the two lowermost banks and five groups of impulses are then successively transmitted from the broker's office, the first two of which select the trading post at which the particular stock is handled and the last three select the stock itself. This selection is made through a plurality of selector switches, such as represented diagrammatically by blocks 102, 103, 104, etc., in the same manner as in machine switching telephone systems. The telephone equipment is represented diagrammatically because this equipment is well-known in the telephone art. These switches are connected to a rotary hunting or connector switch represented diagrammatically by block 105 which is provided to hunt, when the "request" line 44—45 is connected through the last selector switch, for an idle sender through a plurality of sender control circuits. Each of the switches is provided with a third or uppermost bank whereby during the selecting operation, the "quotation" line 47 is being simultaneously connected through the various switches and is connected to the idle sender 80 as soon as it is found by the hunting switch.

The senders or transmitting points connected to the hunting switch 105 are the sender relays 106, 107 and 108, etc., which are shown connected in series in the circuit extending to battery over the armature and contact of a master sender relay 109. The master relay is arranged to operate through two sets of post keys individual thereto and represented diagrammatically by block 110, in response to the impulses transmitted from a common sending device 111, also represented diagrammatically. One set of sender relays, a master relay and two sets of post keys are provided for each stock listed in the exchange, the sending device 111 being common to all stocks. This sending equipment is operated in the manner shown and described in the applicant's copending application, Serial No. 564,940, supra.

As stated above, the functions of machine switching apparatus consists in selecting over the "request" line, a certain post, a certain stock at this post and by means of the connector switch 105, an idle control circuit comprising relays A and B which control the selection of an idle sender relay. Each of the sender relays is arranged to repeat at regular intervals current impulses corresponding to the "bid" and the "asked" quotations of a certain stock as indicated on the operated keys of the two sets represented by block 110. After the bid quotation a "space" impulse is transmitted and after the "asked" quotation a "wait" impulse is transmitted as described in the applicant's copending application, Serial No. 564,940, supra. As soon as the "wait" impulse is received in the sender relays the connector switch would then pick out an idle control circuit which has ground connected over the outer armature of a relay B for a sufficient time to establish the connection between the rotary wiper and the contact of the switch. This connection would be made only during the "wait" interval which has a duration of about ½ second. When the quotation line is connected through the selecting switches to the control circuit, battery associated with the printing mechanism 12 in Fig. 1, becomes available to the selected control circuit and the relays A and B of the selected circuit operate relay B being operated through its right hand winding. Relay B in operating, completes at its inner armature and contact the circuit extending over "quotation" line 47. Simultaneously, the ground at the outer armature of relay B is removed from the control circuit and should a second call for information of the same stock be received at this instant over another connector switch (not shown) the rotary brush or wiper of the other connector would pass over the first contact onto the second whereat it would find ground at the armature and contact of relay A of the first control circuit, the circuit containing the new ground being traceable from the armature and contact of relay A in the first control circuit, back contact and armature of relay B in the second control circuit through the second contact of the other connector through the selecting switches (not shown) to the "quotation" line (not shown) extending to the brokerage office putting in the second call. In this way two or more calls from different brokerage offices may be connected through simultaneously to receive the "bid-asked" quotations on any certain stock. Relays A and B in each of the controlling circuits are released during the transmission of the "wait" impulse when each of the sender relays 106, 107, 108, etc., are held operated for a period of approximately ½ second, the relays A and B being of the slow release type and designed to release during the "wait" interval. Should all control circuits be busy at the time of an incoming request, all the relays A and B will be in operated positions. Means represented diagrammatically by block 112 could be provided for registering at the stock exchange the number of times all senders are busy in the same manner as in telephone systems when all trunks are busy.

*Operation of the system*

For the purpose of illustration a simple connection will be established by assuming that the operator at the brokerage office wherein the printer set 11 is located, desires the latest "bid-asked" quotations of a stock having the signal combination of AD. It is also assumed that the stock AD is located at trading post No. 3 at the Exchange. The operator presses the "zero", "3", "A", "D", "zero" and "request" keys successively on the keyboard at the printer set 11 to transmit sets of impulses corresponding to a called number such as zero, three, two, three and zero. The printer typewriter is designed to permit the operation of only one key at a time, a second key being prevented from being operated for a predetermined interval wherein "dialing" impulses corresponding to the first key, are being transmitted over the "request" line 44—45. This predetermined interval may be regulated by a suitable timing arrangement as stated above, to correspond to the timing arrangement used with the "dial" telephone wherein the rotatable dial must return to its normal position before it may be operated a second time. The operation of the "zero" key for the first digit of the called number causes pull bar 18 to momentarily close its associated contacts "x" and thereby complete a circuit extending from ground at pull bar 18, over conductor 71, through the right hand winding of relay 39, conductor 72, to grounded battery at the armature of relay 40, it being understood that the relay 40 is in its operated position due to the closure of key 42 which completed the operating circuit for the printer set motor 43 and relay 40. Relay 39 operates and locks itself in a circuit extending from conductor 72, through its left hand winding, closed contacts 73, to ground at its outer left hand armature. Also the operation of relay 39 closes at the inner left hand armature a circuit extending from ground, through the winding of the solenoid 60, to grounded battery. The solenoid 60 becomes energized and pulls the plunger bar 70 to the right sufficiently to open the normally closed contacts 73. The locking circuit for relay 39 and the operating circuit for solenoid 60 are therefore opened and both the relay and solenoid are restored to their normal positions. The plunger bar 70 is being restored due to the tension of a coil spring 74, causes the normally closed contacts 75 to open and close a number of times by the passage of the notched portion of the plunger bar over the resilient member of contacts 75 and to thereby send ten impulses at the regular "dialing" speed over the request line 44—45. After the last impulse of the ten is transmitted the normally closed contacts 88 which were opened at the start of the operation of bar 70, is closed whereby a circuit including contacts 88 and certain locking mechanism in the printer 11, is closed to permit the operation of a second key. Key "3" is then operated and the same sequence of operation is completed but by means of the pull bar associated with key "3", relay 31, solenoid 52 and plunger bar 62. The return of plunger bar 62 to normal transmits three "dialing" impulses over the "request" line. At the end of the second interval key "A" is operated and two impulses are operated over the "request" line by means of the operation of the pull bar 14, relay 30, solenoid 51 and plunger bar 61. After each of the remaining intervals keys "B" and "zero" are operated in their order and in like manner two and ten impulses are successively transmitted over the request line. Immediately after the impulses corresponding to the last operated key, which in this case is key "zero", are transmitted, a "request" key is operated and the pull bar R associated therewith causes grounded battery 76 to be connected in a circuit extending over conductor 77, through the right hand winding of relay 46 to ground. Relay 46 operates and locks itself in a circuit extending from grounded battery at the left hand armature of relay 46, closed contacts of wipe-out switch 50, over the normally closed contacts at the right armatures of relays 30 to 39, inclusive, conductor 78, through the left hand winding of relay 46, to ground. Also relay 46 causes its right armature to move from its back contact to its front contact. Its back contact is normally connected to ground in a circuit extending over the normally closed contacts, such as 79 to 88, conductor 81, to grounded battery 89. This is the circuit which prevents the operation of a second key until the end of a predetermined interval following the operation of the first key, the duration of the interval being determined by the time that one of the contacts 79 to 88 is open because of the operation of its associated plunger bar. The right armature of relay 46 is now included in the "quotation" line 47 and therefore the receiving mechanism of printer set 12 is connected to the "quotation" line when relay 46 is operated.

The operation of the line finder, the selector and the connector switches at the exchange, in response to the transmitted impulses corresponding to the called number, causes the quotation line to be connected to the first idle sender relay, such as one of those designated 106, 107, 108, etc. The requested information which is repeated by the selected idle sender relay, is then printed on the tape at printer set 11 adjacent to the signal combination of the requested stock.

A restoring arrangement, such as disclosed in the applicant's copending application, Serial No. 564,940, supra, may be employed whereby all the machine switching telephone switches and sender control circuit at the exchange may be restored to normal when the "wait" impulse is transmitted by the common sending device 106. However, the relay 46 at the brokerage office remains operated until the attendant at the brokerage office opens the locking circuit thereof by operating wipe-out key 50.

What is claimed is:

1. In an intelligence transmission system, a plurality of elements for storing information of a changeable nature, and means at a plurality of points remote to said storing elements for requesting, by means of telegraph signal impulses, the latest information stored on any one of said storing elements, characterized in this that means are provided at each of said remote points for converting said telegraph signal impulses into impulses different in number and character essential to the selection of the elements at which the desired information is stored.

2. In an impulse transmission system, a central point, a plurality of remote points, a plurality of transmission channels connecting said central point with said remote points, a plurality of devices at said central point for storing information, selective devices at each of said remote points for requesting, by means of a telegraph permutation code apparatus, the information stored on any one of said storing devices, automatic switching means at said central point, responsive to telephone "dialing" impulses, for selecting the devices at which the desired information is stored, and other devices at each of said remote points for generating telephone "dialing" impulses from said telegraph permutation code.

3. A system comprising a device for selecting an element in accordance with a telegraphic permutation code group, in combination with a time delayed element (61, 62, etc.) for producing as a result of the selection a continuous chain of dot impulses corresponding to a chain of dialing impulses used in machine switching telephone systems, and mechanism responsive to said chains of dot impulses for selecting a desired circuit.

4. A system in accordance with claim 3 wherein devices for generating a distinctive permutation code combination at one place cause the selection of a distinctive instrument at another place by the operation of mechanism at said other place operating under the control of said chains of dot impulses, characterized in this that said distinctive instrument selected is connected to said one place to send a distinctive message thereto.

5. In an impulse transmission system, according to claim 2, wherein the automatic switching means is telephone machine switching equipment.

6. In an impulse transmission system, according to claim 2, wherein there are means for connecting two or more remote points to simultaneously receive the same information.

7. In an impulse transmission system, a machine for selecting an element in accordance with a permutation code group, a device connected to the selected element producing as a result of the selection of said element a distinctive continuous chain of sequence selecting impulses, and a circuit controlling device for preventing said machine from selecting another element until said chain of impulses has been completed.

8. In an impulse transmission system, according to claim 2, wherein the generating devices comprise a plurality of electromagnetic devices individually operative in response to a telegraph permutation code selection, and individually capable when released, to transmit at a uniform speed and in a definite prescribed order telephone "dialing" impulses.

9. A system comprising a telegraphic permutation code sender and mechanism including relays and pulse senders responsive to each distinctive permutation of said permutation code to control the generation of a correspondingly distinctive continuous chain of dot impulses of the selecting type produced by a telephone calling dial.

10. A system comprising a sending device adapted to have stored therein various permutations of elements corresponding to different information, a plurality of distant stations each provided with a telegraphic printer machine, mechanism comprising sequence selecting switches controlled by the appropriate operation of said machine at any distant station to establish a circuit between said sending device and the said station whereat said machine is located, and instrumentalities for sending over said circuit the information stored in said sending devices.

11. A system comprising a sending device adapted to have stored therein various permutations of elements corresponding to different information, a plurality of different stations each provided with a telegraphic sending machine, mechanism controlled by the operation of said machine to establish a circuit between said sending device and the station whereat said machine is located for the transmission thereover of the stored information, characterized in this, that means are provided whereby an operative plurality of such circuits may be simultaneously established between said sending device and a plurality of said different stations.

LELAND A. GARDNER.